(12) United States Patent
Lee et al.

(10) Patent No.: US 10,075,917 B2
(45) Date of Patent: Sep. 11, 2018

(54) METHOD AND APPARATUS FOR TRANSMITTING POWER SAVING POLL

(71) Applicant: Samsung Electronics Co., Ltd., Suwon-si, Gyeonggi-do (KR)

(72) Inventors: Kiseok Lee, Yongin-si (KR); Kangjin Yoon, Seoul (KR); Dohy Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 14/741,865

(22) Filed: Jun. 17, 2015

(65) Prior Publication Data

US 2015/0365895 A1 Dec. 17, 2015

(30) Foreign Application Priority Data

Jun. 17, 2014 (KR) .................. 10-2014-0073542

(51) Int. Cl.
*H04W 52/02* (2009.01)
*H04L 1/00* (2006.01)
*H04W 24/00* (2009.01)
*H04W 84/12* (2009.01)

(52) U.S. Cl.
CPC .......... *H04W 52/0219* (2013.01); *H04L 1/00* (2013.01); *H04W 24/00* (2013.01); *H04W 52/0216* (2013.01); *H04W 52/0229* (2013.01); *H04W 84/12* (2013.01); *Y02D 70/00* (2018.01); *Y02D 70/1262* (2018.01); *Y02D 70/1264* (2018.01); *Y02D 70/142* (2018.01)

(58) Field of Classification Search
None
See application file for complete search history.

(56) References Cited

U.S. PATENT DOCUMENTS

| | | | | |
|---|---|---|---|---|
| 2005/0141543 A1* | 6/2005 | Nishimura | ............ | H04W 74/06 370/443 |
| 2007/0147330 A1* | 6/2007 | Smith | ............... | H04W 52/0229 370/346 |
| 2010/0189024 A1* | 7/2010 | Xhafa | ................ | H04W 76/048 370/311 |
| 2013/0121221 A1 | 5/2013 | HomChaudhuri et al. | | |
| 2013/0235720 A1* | 9/2013 | Wang | ................ | H04W 28/0278 370/229 |
| 2014/0092797 A1* | 4/2014 | Chu | ................ | H04W 52/0216 370/311 |
| 2014/0169290 A1* | 6/2014 | Seok | ................ | H04W 74/006 370/329 |
| 2015/0023236 A1* | 1/2015 | Choi | ................ | H04W 52/0225 370/311 |

(Continued)

*Primary Examiner* — Peter Chen
(74) *Attorney, Agent, or Firm* — Jefferson IP Law, LLP (57) ABSTRACT

A method and an apparatus of transmitting power saving-poll (PS-Pall) for use in a wireless network are provided. The method includes a terminal in a wireless communication system determining PS-Poll transmission priorities of terminals based on identifiers of the terminals having downlink data to receive, monitoring to detect the PS-Polls of the terminals having downlink data to receive, and transmitting, when the PS-Poll of the terminal with a priority followed right by the priority of the terminal is received, the PS-Poll after expiry of an arbitrary backoff timer.

13 Claims, 7 Drawing Sheets

(56) References Cited

U.S. PATENT DOCUMENTS

2015/0036572 A1\* 2/2015 Seok ................. H04W 52/0216
370/311
2015/0103767 A1\* 4/2015 Kim ..................... H04W 74/06
370/329

\* cited by examiner

METHOD AND APPARATUS FOR TRANSMITTING POWER SAVING POLL

CROSS-REFERENCE TO RELATED APPLICATION(S)

This application claims the benefit under 35 U.S.C. § 119(a) of a Korean patent application filed on Jun. 17, 2014 in the Korean Intellectual Property Office and assigned Serial number 10-2014-0073542, the entire disclosure of which is hereby incorporated by reference.

TECHNICAL FIELD

The present disclosure relates to a method and an apparatus for transmitting power saving-poll (PS-Pall) in a wireless network. More particularly, the present disclosure relates to a PS-Poll transmission method and apparatus that is capable of avoiding collision of PS-Poll frames and guaranteeing PS-Poll transmission fairness in the power saving mode of the institute of electrical and electronics engineers (IEEE 802.11) standard.

BACKGROUND

In the power saving mode of the current institute of electrical and electronics engineers (IEEE) 802.11 standard, a terminal alternates between doze and awake states: the doze state being unable to transmit/receive and the awake state being able to transmit/receive with full power supply. The awake interval of the terminal is identical with a Beacon Interval of an access point (AP).

The AP buffers downlink data to the terminals in the doze state and notifies the terminals of the presence of the data for them, when they are awaken, using a Partial Virtual Bitmap field of a traffic indication map (TIM) in the beacon. The AP allocates an association ID (AID) to every terminal operating in the power saving mode. Each AID corresponds to each bit of the Partial Virtual Bitmap field. In this way, the AP notifies the terminals of the presence of the buffered data for them with the Partial Virtual Bitmap field indicating the AIDs of the terminals having buffered data present for them.

The terminals having the buffered data transmit a power save-poll (PS-Poll) frame according to the distributed coordination function (DCF) of IEEE 802.11 standard as in a contention-based access scheme. The AP transmits the buffered downlink data to the terminals which have transmitted the PS-Poll frames.

The contention-based DCF has a drawback in that the probability in which the terminals transmit the PS-Poll simultaneously increases in proportion to the number of contending terminals. This indicates that the PS-Poll transmission failure probability increases as the number of terminals having downlink data to receive increases in the contention-based DCF.

Furthermore, since the terminals transmitting the PS-Poll are determined based on randomness, it is difficult to guarantee PS-Poll transmission fairness for all competing terminals in the contention-based DCF.

There are some methods of the related art proposed to address the above issues. Among them, the Proxy carrier sense multiple access (CSMA) is a technique in which the AP selects some of the AIDs of the terminal having downlink data buffered and indicates them in the Partial Virtual Bitmap field so as to avoid excessive contention. Station Grouping is a technique of assigning priorities to the terminals to create a group of terminals to be indicated in the Partial Virtual Bitmap field for fair PS-Poll transmission in the course of performing the Proxy CSMA. TIM monitoring is a technique in which a terminal determines the number of terminals to contend by referencing a TIM so as to select a backoff value for use in the area corresponding to the number of the terminals.

The above-described techniques of the related art are disadvantageous in terms of low effectiveness in comparison to their high implementation complexities. For example, although it is possible to reduce the PS-Poll collision probability to some extent, the techniques of the related art cannot avoid PS-Poll collision completely. Furthermore, in the respect that the Proxy CSMA and Station Grouping techniques are implemented in the AP while the TIM Monitoring technique is in the terminal, these techniques of the related art are distributive so as to make it difficult to implement integrally. Although the techniques of the related art make it possible to expect partial collision avoidance effect with modification of the operations of the terminal and AP, there is a need of an enhanced PS-Poll transmission method capable of avoiding PS-Poll collision efficiently only with the modification of the operation of the terminal.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure aims to provide a power saving-poll (PS-Poll) transmission method and apparatus that is capable of avoiding collision of PS-Poll frames and guaranteeing PS-Poll transmission fairness in the power saving mode of the institute of electrical and electronics engineers (IEEE 802.11) standard.

In accordance with an aspect of the present disclosure, a PS-Poll transmission method of a terminal in a wireless communication system is provided. The PS-method includes determining PS-Poll transmission priorities of terminals based on identifiers of the terminals having downlink data to receive, monitoring to detect the PS-Polls of the terminals having the downlink data to receive, and transmitting, when the PS-Poll of the terminal with a priority followed right by the priority of the terminal is received, the PS-Poll after expiry of an arbitrary backoff timer.

In accordance with another aspect of the present disclosure, a PS-Poll reception method of a base station in a wireless communication system is provided. The method includes monitoring to detect PS-Polls of terminals and transmitting, when the PS-Polls are received, downlink data to the terminals transmitted the PS-Polls, wherein the PS-Polls are received from the terminals according to PS-Poll transmission priorities of the terminals that are determined based on identifiers of the terminals having downlink data to receive.

In accordance with another aspect of the present disclosure, a terminal of transmitting a PS-Poll in a wireless communication system is provided. The terminal includes a communication unit configured to perform data communication and a control unit configured to determine PS-Poll transmission priorities of terminals based on identifiers of the terminals having downlink data to receive, to monitor to detect the PS-Polls of the terminals having the downlink data to receive, and to control the communication unit to transmit, when the PS-Poll of the terminal with a priority followed right by the priority of the terminal is received, the PS-Poll after expiry of an arbitrary backoff timer.

In accordance with another aspect of the present disclosure, a base station for receiving PS-Polls in a wireless communication system is provided. The base station includes a communication unit configured to perform data communication and a control unit configured to monitor to detect PS-Polls of terminals and to control the communication unit to transmit, when the PS-Polls are received, downlink data to the terminals transmitted the PS-Polls, wherein the PS-Polls are received from the terminals according to PS-Poll transmission priorities of the terminals that are determined based on identifiers of the terminals having downlink data to receive.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In various embodiments of the present disclosure, an access point (AP) may be referred to as a 'base station', a 'Node B', or an 'evolved Node B (eNB)'.

In various embodiments of the present disclosure, the terminal may be referred to as a 'system', a 'subscriber unit', a 'subscriber station', a 'mobile station', a 'remote station', a 'remote terminal', a 'mobile device', a 'user terminal', a 'terminal', a 'wireless communication device', a 'user agent', a 'user device', or a 'user equipment (UE)'. The terminal may be a cellular phone, a personal digital assistant (PDA), a handheld device with radio access capability, a computing device, a device connected to a wireless modem, and the like.

Although the description is directed to an Institute of Electrical and Electronics Engineers (IEEE) 802.11 wireless communication network, the present disclosure is not limited to any type of radio communication system but can be applied to various radio communication systems, such as the $3^{rd}$ Generation Partnership Project (3GPP) Long Term Evolution (LTE) and LTE-Advanced (LTE-A) without departing from the scope of the present disclosure.

Various embodiments of the present disclosure are described with reference to the accompanying drawings. Detailed description of well-known functions and structures incorporated herein may be omitted to avoid obscuring the subject matter of the present disclosure. Further, the following terms are defined based on the functionality in the present disclosure, and may vary according to the intention of a user or an operator, usage, and the like. Therefore, the definition should be made based on the overall content of the present specification.

Figure 1:
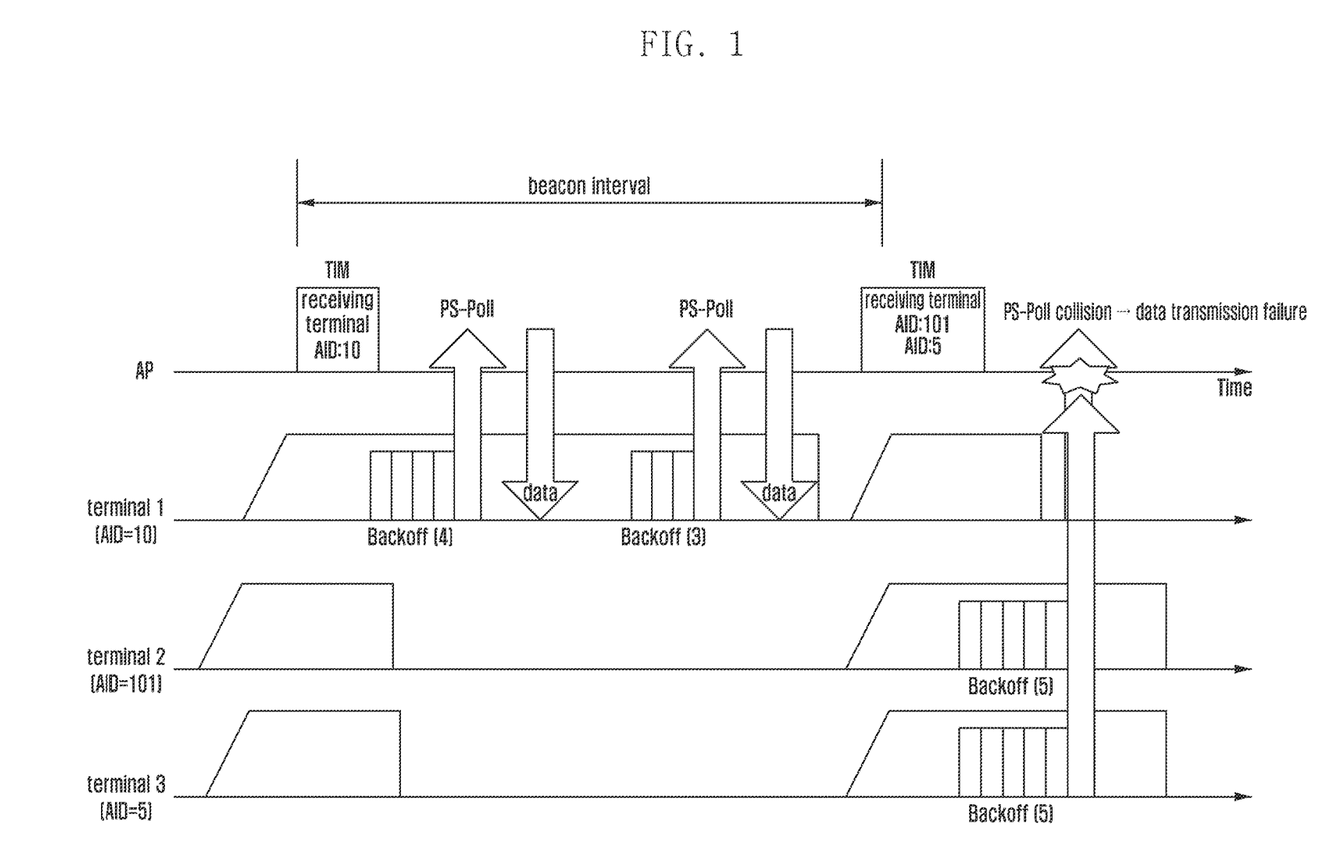
FIG. 1 is a diagram illustrating a frame exchange procedure in a power saving mode according to an embodiment of the present disclosure.

FIG. 1 is a diagram illustrating a frame exchange procedure in a power saving mode according to an embodiment of the present disclosure.

Referring to FIG. 1, the terminal in the power saving mode has a unique AID allocated by an AP.

The AP transmits a beacon including a Partial Virtual Bitmap field of the Traffic Indication Map (TIM) to the terminals having the downlink data present for them at the beacon interval, each bit of the TIM representing the AID of a terminal.

The TIM is structured as specified in the IEEE 802.11 standards. The TIM may include the Partial Virtual Bitmap field. The Partial Virtual Bitmap field includes a virtual bitmap for indicating the terminals having the downlink data buffered for them in the current AP in the form of compressed information. The bits of the virtual bitmap represent the AIDs of the respective terminals connected to the AP in the form of flags according to the priority order of AIDs. Specifically, the flag, i.e., the each bit representing the AID of a terminal, is set to 1 if the AP has buffered downlink data present for it and, otherwise, 0.

If a beacon is received, the terminal determines the bit representing AID of the terminal in the Partial Virtual Bitmap field to determine whether the AP has any buffered downlink data present for the AP. If so, enters the IEEE 802.11 DCF mode to transmit the PS-Poll. In the contention-based DCF mode, the terminal selects a backoff value randomly to avoid PS-Poll collision and decreases the backoff counter by one for every transmission period (e.g., a slot). If the backoff counter reaches 0, the terminal transmits the PS-Poll. As a consequence, the terminal selected the smallest backoff value wins the contention so as to transmit the PS-Poll. After transmitting the PS-Poll successfully, the terminal transmits the PS-Poll repeatedly at the beacon interval until the downlink data are received completely from the AP.

If two or more terminals select the same backoff value, this indicates PS-Poll collision. Since the terminal does not know the backoff counters of other terminals, plural terminals may select the same backoff values and thus attempt transmitting PS-Polls simultaneously. If this causes collision, the terminals cannot receive the downlink data correctly.

The present disclosure proposes a method in which the terminals transmit PS-Polls cyclically in a certain order (e.g., an ascending order) of AIDs allocated unequally to the terminals so as to avoid PS-Poll collision and guaranteeing fair transmission opportunity to the terminals.

Figure 2:
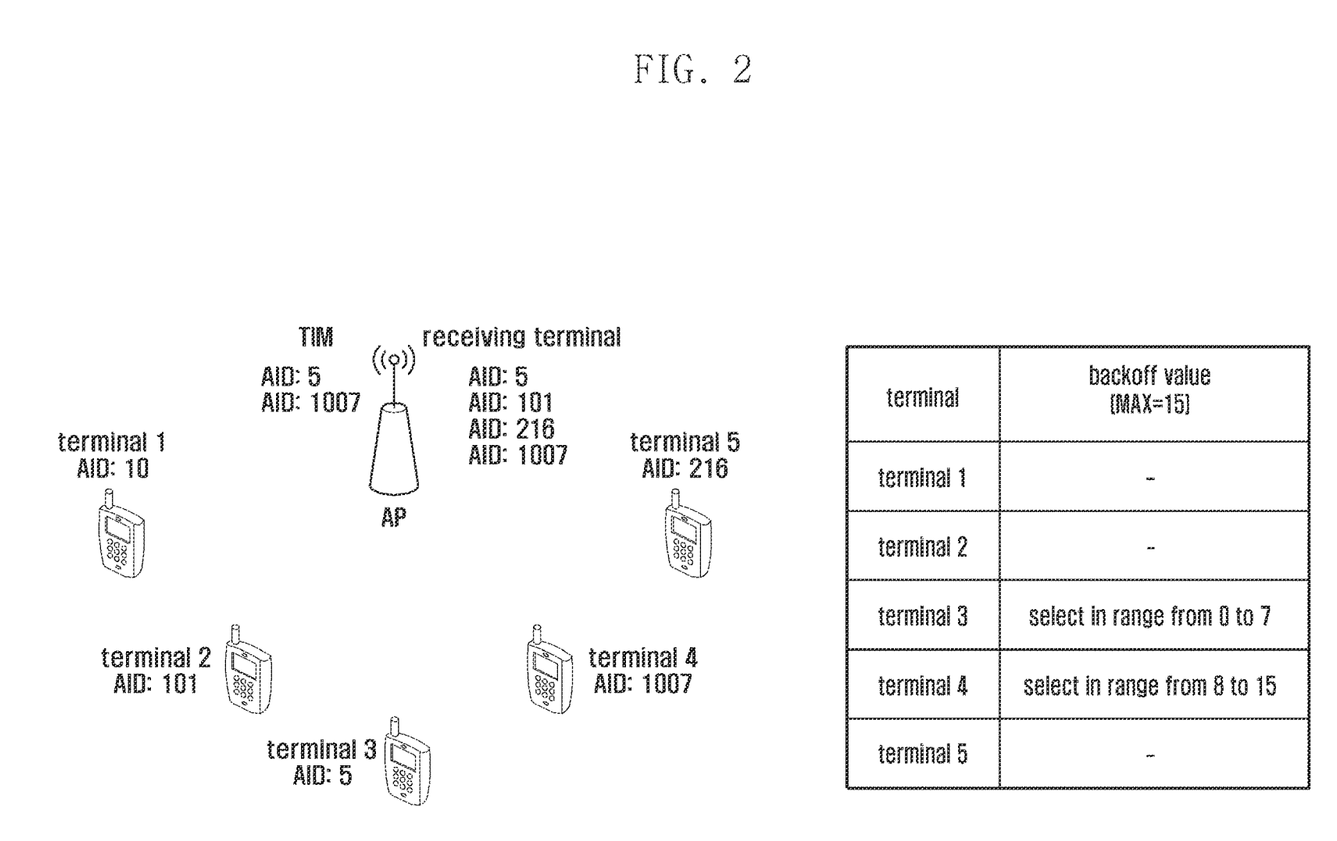
FIG. 2 is a diagram illustrating a backoff value allocation method for avoiding power saving-poll (PS-Poll) collision according to an embodiment of the present disclosure.

FIG. 2 is a diagram illustrating a backoff value allocation method for avoiding PS-Poll collision according to an embodiment of the present disclosure.

Referring to FIG. 2, the AP and terminals may control the backoff value allocation to avoid PS-Poll collision occurring when the terminals select the same backoff value.

Specifically, the AP may indicate the AIDs of the terminals grouped according to a purpose among the terminals having downlink data present for them in the Partial Virtual Bitmap field of the TIM. The terminals of which AIDs are indicated in the Partial Virtual Bitmap field may select backoff values randomly in respective sub-ranges of the selection range of backoff values.

According to the method of FIG. 2, it is possible to reduce PS-Poll collision but impossible to avoid the PS-Poll collision completely. The terminals of other groups in which AID reception is delayed also experience delay of receiving the downlink data.

In the following, a description is made of the PS-Poll transmission method that is capable of transmitting data efficiently without PS-Poll collision.

Figure 3:
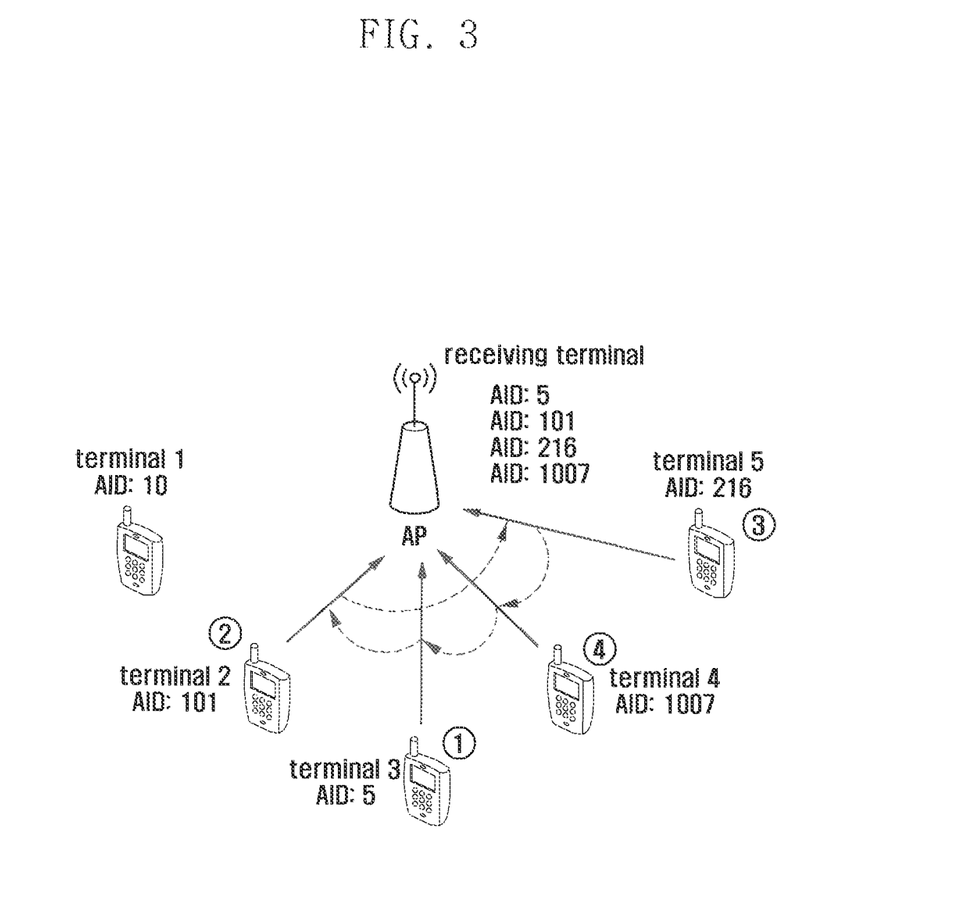
FIG. 3 is a diagram illustrating a PS-Poll transmission method according to an embodiment of the present disclosure.

FIG. 3 is a diagram illustrating a PS-Poll transmission method according to an embodiment of the present disclosure.

Referring to FIG. 3, the terminal arranges the AIDs of the terminals having downlink data present for them in an order (e.g., an ascending order) in the Partial Virtual Bitmap field. Each terminal may determine the turn (order or priority) of the terminal based on the arranged AIDs. Since the AID of each terminal is unique, the turn of transmission of each terminal is also unique. Accordingly, if the terminals transmit PS-Polls at their respective turns, it is possible to avoid PS-Poll collision.

In the following, a description is made of the embodiment in which the terminal arranges the AIDs in a descending order to determine the turns of the respective terminals. However, the AID arrangement order is not restricted thereto. For example, the terminal may arrange the AIDs in the descending order or a certain order according to a method, an algorithm, or a rule to determine the priorities of the terminals.

Figure 4:
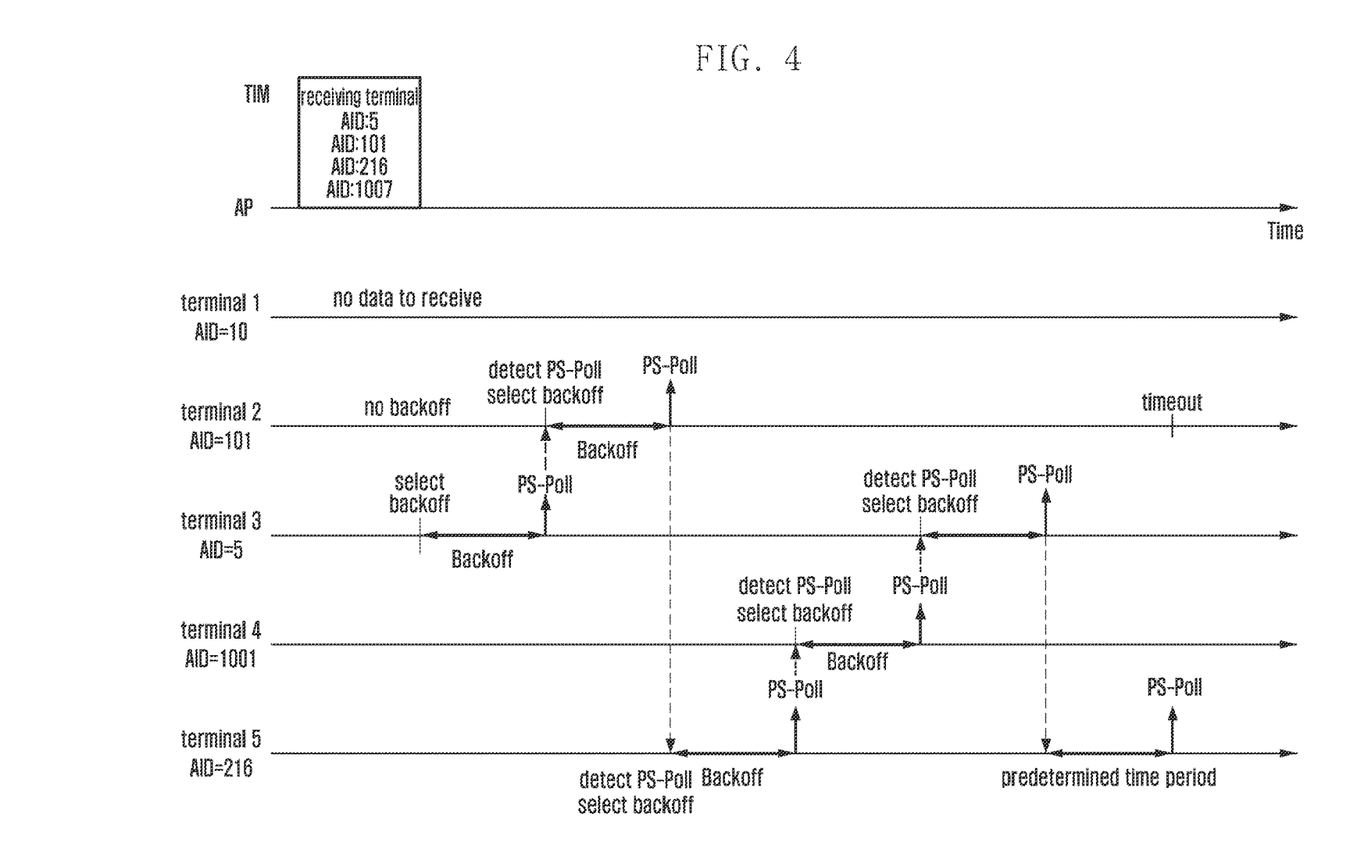
FIG. 4 is a diagram illustrating PS-Poll transmission timings of terminals according to an embodiment of the present disclosure.

FIG. 4 is a diagram illustrating PS-Poll transmission timings of terminals according to an embodiment of the present disclosure.

Referring to FIG. 4, where AID=5, AID=101, AID=216, and AID=1007 are indicated in the Partial Virtual Bitmap field of the TIM, the terminal 1 with the AID=10 has no downlink data to receive and thus operates in the doze state. Each of the terminals 2, 3, 4, and 5 having downlink data to receive analyzes the Partial Virtual Bitmap field to arrange the AIDs of the terminals in the ascending order and determines the turn (priority) of each terminal.

The terminal having the highest priority selects the backoff value in a certain backoff value range (0 to a maximum poll value) and, if the backoff timer expires, transmits the PS-Poll. Here, the maximum poll value is a variable determined at the manufacturing stage of the terminal. In the embodiment of FIG. 4, the terminal 3 has the highest priority and thus the terminal 3 selects a backoff value and transmits the PS-Poll when the backoff timer expires. The terminal may transmit the PS-Poll including AID or a parameter of the terminal indicating its transmission priority as the information on turn of the terminal.

The terminal of which priority is not the highest one does not select a backoff value immediately, although the terminal receives the TIM, but waits. The terminal monitors the PS-Polls transmitted by other terminals in the waiting state. If the PS-Poll of the terminal having the priority followed right by the priority of the terminal is received, the terminal selects a backoff value in a certain backoff value range. The terminal transmits the PS-Poll using the selected backoff value in the contention-based DCF mode.

After transmitting the PS-Poll successfully, the terminal monitors the PS-Poll including the AID with the priority followed right by the priority of the terminal to select a backoff value to transmit the PS-Poll repeatedly. At this time, the terminal having the highest priority selects a backoff value first to transmit the PS-Poll and then may monitor to detect the PS-Poll signal of the terminal having the lowest priority.

In the embodiment of FIG. 4, the terminal 2 having the second highest priority monitors to detect the PS-Polls of other terminal instead of selecting a backoff value. If the PS-Poll of the terminal 3 having the priority followed right by the priority of the terminal 3 is detected, the terminal 2 selects a backoff value and transmits the PS-Poll when the backoff timer expires. Likewise, the terminal 5 having the third highest priority and the terminal 4 having the fourth priority monitor to detect the PS-Polls of the PS-Polls of the terminals 2 and 5 respectively and, if the PS-Polls of the terminals having the priorities followed right by their priorities are detected (received), select backoff values to transmit PS-Polls respectively.

To transmit the PS-Poll repeatedly, the terminal 3 having the highest priority monitors to detect the PS-Poll of the terminal 4 having the lowest priority and, if the PS-Poll of the terminal 4 is received, selects a backoff value to transmit the PS-Poll.

In an embodiment of the present disclosure, the terminal monitors to detect the PS-Poll including the AID of the terminal having the priority followed right by the priority of the terminal and, if no PS-Poll including the AID of the terminal having the priority followed right by the priority of the terminal is received during a certain period, may ignore the information on the terminal having the priority followed right by the priority of the terminal and transmit the PS-Poll immediately without selecting a backoff upon expiry of the certain period. At this time, the terminal may discard the information on the terminal having the priority followed right by the priority of the terminal in the ascending priority order of AIDs.

In the embodiment of FIG. 4, after the terminal 3 has transmitted the PS-Poll of the terminal 3, the terminal 2 having the next highest priority may not transmit the PS-Poll for a certain reason. If the terminal 2 does not transmit the PS-Poll even when the maximum backoff period it can select has expired, timeout may occur. If no PS-Poll of the terminal 2 having the priority followed right by the priority of the terminal 5 is received during a certain time period, the terminal 5 may transmit the PS-Poll without selecting any backoff value.

Here, the certain time period may be determined according to various methods. The time period may be determined based on at least one of the maximum backoff period, time at which the terminal detects the PS-Poll of another terminal, time at which the terminal transmits the PS-Poll, and a number of terminals receiving downlink data.

For example, the certain time period may be the period from the time when the terminal detects the PS-Poll of the terminal having the second-preceding priority to the maximum backoff period. For example, the certain time period may be the time period from the time when the terminal detects the PS-Poll of the terminal having the preceding priority to the time defined by multiplying the number of terminals having downlink data to receive with the maximum backoff period. The certain time period and the maximum backoff period may be determined based on the network congestion degree or provided by the AP.

According to the above method, since the terminals transmit PS-Polls at their turns determined in an order of AIDs, it is possible for the terminals to transmit the PS-Polls cyclically so as to guarantee fair PS-Poll transmission.

Figure 5:
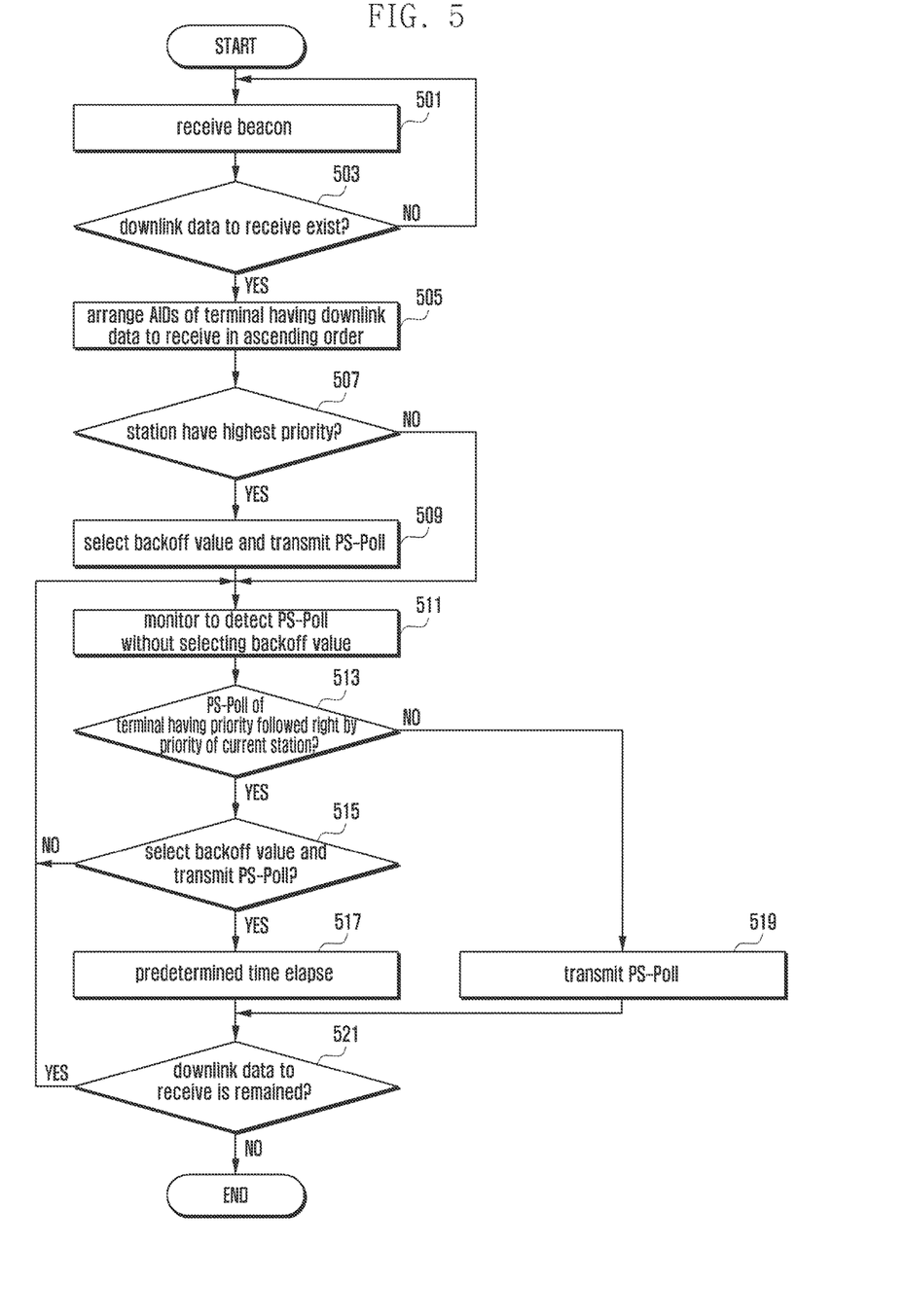
FIG. 5 is a flowchart illustrating a PS-Poll transmission method of a terminal according to an embodiment of the present disclosure.

FIG. 5 is a flowchart illustrating a PS-Poll transmission method of a terminal according to an embodiment of the present disclosure.

Referring to FIG. 5, the terminal receives a beacon at operation 501. The terminal may receive the beacon transmitted by the AP in the awake state.

Upon receipt of the beacon, the terminal analyzes the partial Virtual Bitmap field of the TIM in the beacon to determine whether the terminal has downlink data to receive at operation 503. The terminal may determine whether the terminal has downlink data to receive based on the bit representing the AID of the terminal in the Partial Virtual Bitmap field. For example, if the bit corresponding to the AID of the terminal is set to 1, the terminal determines that the terminal has downlink data to receive.

If the terminal has no downlink data to receive, the terminal stays in the doze state and wakes up at the beacon interval to operate as above.

If the terminal has downlink to receive, the terminal arranges the AIDs of the terminals having downlink data in a certain order (e.g., an ascending order) at operation 505. The terminal determines the other terminals having downlink data based on the Partial Virtual Bitmap field and arranges the terminals having the downlink data to receive and including the terminal itself in the ascending order of AIDs. The terminal may judge the PS-Poll transmission turns of the terminals corresponding to the AIDs arranged in the ascending order.

The terminal determines whether the terminal has the highest priority based on the AIDs arranged in the ascending order at operation 507.

If the terminal has the highest priority, the terminal selects a backoff value and transmits the PS-Poll prior to other terminals at operation 509. The terminal selects the backoff value in a certain backoff value range and, if the backoff timer corresponding to the selected backoff value expires, transmits the PS-Poll. The terminal may transmit the PS-Poll including a parameter indicating AID or the turn of the terminal as the information related to the turn of the terminal for transmitting the PS-Poll. The terminal may receive the downlink data from the AP in response to the PS-Poll.

If the terminal has no highest priority or, although the terminal has the highest priority, the terminal has already transmitted the PS-Poll, the terminal monitors to detect PS-Polls of other terminals without selecting a backoff value at operation 511. The terminal monitors to detect the PS-Polls transmitted by neighbor terminals and analyzes AIDs and information on the priorities included in the PS-Polls.

The terminal determines whether the PS-Poll of the terminal having the priority followed by the priority of the terminal is received based on the information included in the received PS-Poll at operation 513. In the case of the terminal having the highest priority, the terminal may determine whether the PS-Poll of the terminal having the lowest priority is received.

If the PS-Poll of the terminal having the lowest priority is received, the terminal selects a backoff value and transmits the PS-Poll at operation 515. The terminal selects the backoff value in a certain backoff value range and, if the backoff timer corresponding to the selected backoff value expires, transmits the PS-Poll. The terminal may receive the downlink data from the AP in response to the PS-Poll.

If the PS-Poll of the terminal having the lowest priority is not received, the terminal determines whether the certain time has lapsed at operation 517.

If the certain time has not lapsed, the terminal monitors to detect the PS-Poll of the terminal having the priority followed right by the priority of the terminal at operation 513.

If the certain time has lapsed, the terminal transmits the PS-Poll at operation 519. If the PS-Poll of the terminal having the priority followed right by the priority of the terminal is not received until the maximum backoff period available for the terminal expires, the terminal may determine that timeout has occurred for that terminal. Thus the terminal transmits the PS-Poll without backoff value selection. The terminal may delete the terminal having the priority followed right by the priority of the terminal from the list of AIDs arranged in the ascending order.

Here, the certain time may be determined in various ways. The time period may be determined based on at least one of the maximum backoff period, time at which the terminal detects the PS-Poll of another terminal, time at which the terminal transmits the PS-Poll, and a number of terminals receiving downlink data. The terminal may receive the downlink data from the AP in response to the PS-Poll.

For example, the certain time period may be the period from the time when the terminal detects the PS-Poll of the terminal having the second-preceding priority to the maximum backoff period. For example, the certain time period may be the time period from the time when the terminal detects the PS-Poll of the terminal having the preceding priority to the time defined by multiplying the number of terminals having downlink data to receive with the maximum backoff period. The certain time period and the maximum backoff period may be determined based on the network congestion degree or provided by the AP.

The terminal determines whether the terminal has more downlink data to receive at operation 521 and, if the data reception is not completed, returns the procedure to the operation of monitoring to detect PS-Polls without backoff value selection to repeat the above-described operation. Whether the terminal has more downlink data to receive may be determined based on the information included in the downlink data received from the AP.

If the data are received completely, the terminal ends the PS-Poll transmission procedure according to an embodiment of the present disclosure.

Figure 6:
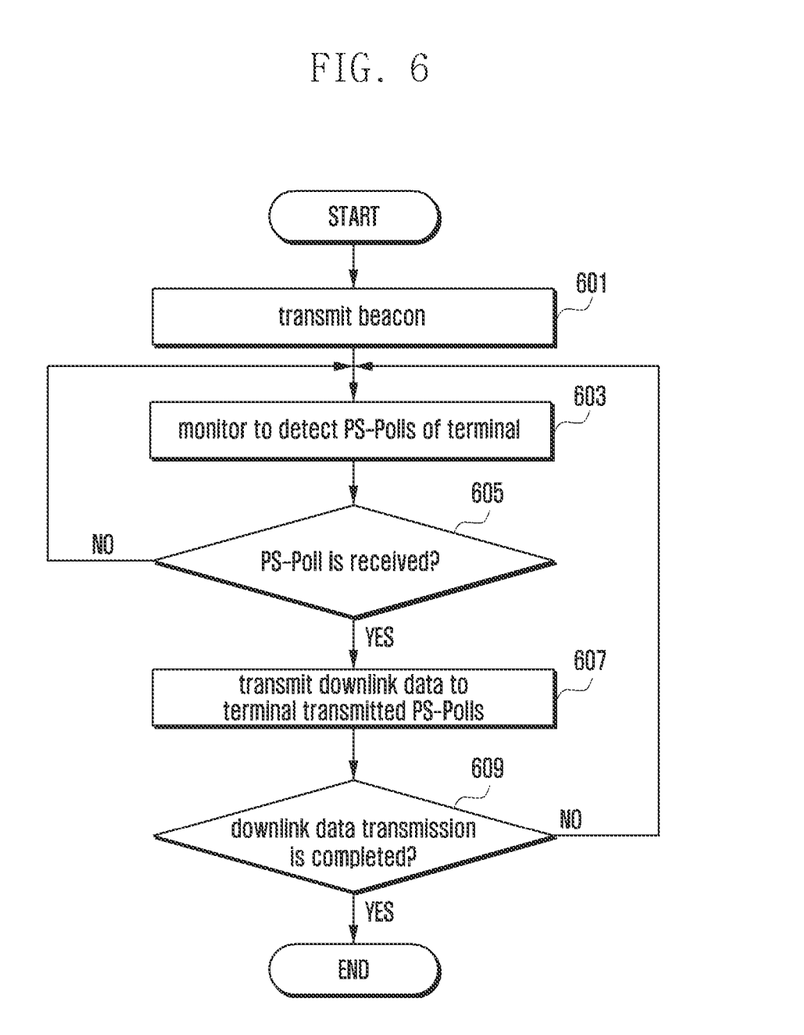
FIG. 6 is a flowchart illustrating a PS-Poll reception method of an access point (AP) according to an embodiment of the present disclosure.

FIG. 6 is a flowchart illustrating a PS-Poll reception method of an AP according to an embodiment of the present disclosure.

Referring to FIG. 6, the AP transmits a beacon at operation 601. The AP may broadcast the beacon at a certain interval. The AP may notify the terminals having downlink data of the presence of the data for them using the Partial Virtual Bitmap field of the TIM in the beacon, the Partial Bitmap field consisting of bits corresponding to the AIDs of the terminals. For example, the AP may set the bits corresponding to the AIDs of the terminals having downlink data present for them to 1 in the beacon.

The AP monitors to detect PS-Polls of the terminals at operation 603. Each of the terminals which have received the beacon determines whether the terminal has downlink data to receive and, if so, arranges the AIDs of the terminals having downlink data to receive in a certain order (e.g., an ascending order) to transmit the PS-Poll at the turn of the terminal. The AP monitors to detect the PS-Polls transmitted by the terminal in the ascending order of AID.

If a PS-Poll is received at operation 605, the AP identifies the terminal which has transmitted the PS-Poll based on the information included in the received PS-Poll. The AP transmits the buffered downlink data to the terminal which has transmitted the PS-Poll at operation 607.

The AP determines whether the buffered downlink data have been transmitted completely at operation 609 and, if the buffered downlink data have not been transmitted completely, returns the procedure to the operation of monitoring to detect PS-Polls to repeat the above operation. If the buffered downlink data have been transmitted completely, the AP ends the PS-Poll reception procedure according to an embodiment of the present disclosure.

Figure 7:
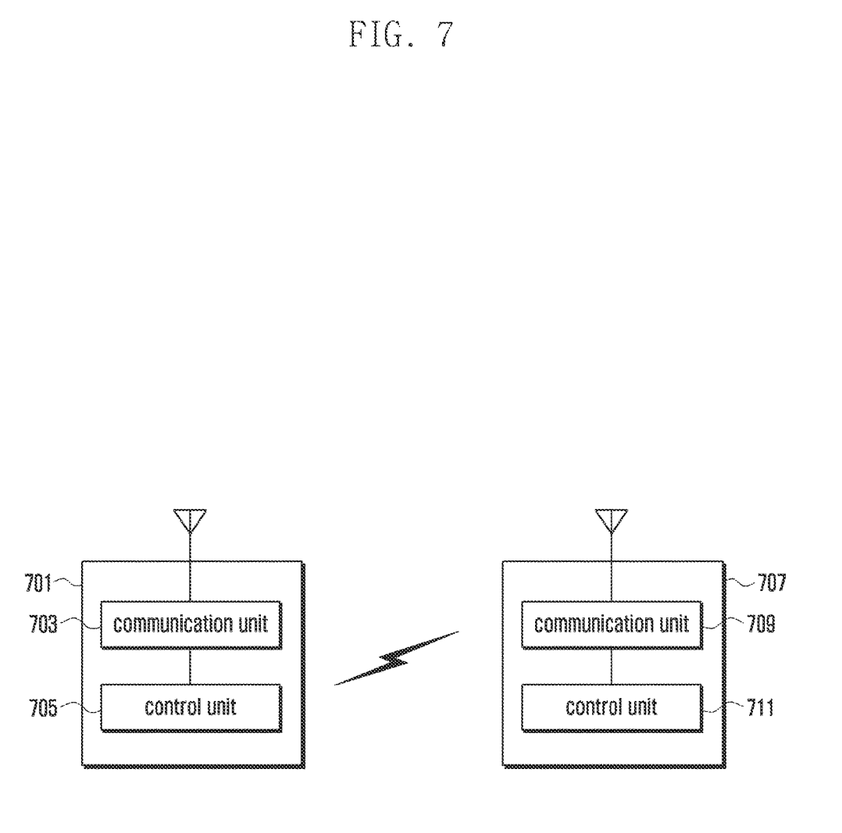
FIG. 7 is a block diagram illustrating configurations of a terminal and an AP according to an embodiment of the present disclosure.

FIG. 7 is a block diagram illustrating configurations of a terminal and an AP according to an embodiment of the present disclosure.

Referring to FIG. 7, a terminal 701 may include a communication unit 703 and a control unit 705.

The communication unit 703 performs data communication with an AP 707 or at least one other terminal under the control of the control unit 705. The control unit 705 controls the components of the terminal 701 which include the communication unit 703 to perform the PS-Poll transmission operation according to an embodiment of the present disclosure. The control unit 705 operates as described above.

The AP 707 may include a communication unit 709 and a control unit 711.

The communication unit 709 performs data communication with at least one terminal 701 under the control of the control unit 711. The control unit 711 controls the components of the AP 707 which include the communication unit 709 to perform the PS-Poll reception operation according to an embodiment of the present disclosure. The control unit 711 operates as described above.

As described above, the method and apparatus of the present disclosure is advantageous in terms of avoiding PS-Poll collision and guaranteeing PS-Poll transmission fairness in the IEEE 802.11 power saving mode.

In addition, the method and apparatus of the present disclosure is advantageous in terms of improving data rate of the IEEE 802.11 network by minimizing transmission delay caused by PS-Poll collision.

In addition, the method and apparatus of the present disclosure is advantageous in terms of reducing unnecessary power consumption caused by PS-Poll collision.

In addition, the method and apparatus of the present disclosure is advantageous in terms of addressing the TCP layer retransmission request transmission unfairness issue by guaranteeing fair PS-Poll transmission opportunity to terminals.

In addition, the method and apparatus of the present disclosure is advantageous in terms of giving compatibility to the terminals complying with the power saving mode of the IEEE 802.11 standard and being applicable in a stepwise manner.

In addition, the method and apparatus of the present disclosure is advantageous in terms of being superior to the techniques of the related art in view of collision probability and PS-Poll transmission fairness and being implemented simply with modification of the operation of the terminal without modification of the operation of the AP.

It is to be appreciated that those skilled in the art can change or modify the embodiments without departing the technical concept of this present disclosure. Accordingly, it should be understood that above-described embodiments are essentially for illustrative purpose only but not in any way for restriction thereto. Thus, the scope of the disclosure should be determined by the appended claims and their legal equivalents rather than the specification, and various alterations and modifications within the definition and scope of the claims are included in the claims.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A power saving poll (PS-Poll) transmission method of a first terminal among terminals in a wireless communication system, the method comprising:
    receiving information on PS-Poll transmission priorities of the terminals having downlink data to receive;
    determining the PS-Poll transmission priorities according to an arrangement order of identifiers of the terminals having the downlink data to receive;
    monitoring a PS-Poll transmitted by at least one of the terminals;
    identifying, based on the PS-Poll transmission priorities, whether a PS-Poll transmitted by a second terminal among the terminals with a priority prior to a priority of the first terminal is detected; and
    transmitting, if the PS-Poll of the second terminal with the priority prior to the priority of the first terminal is detected, a PS-Poll of the first terminal after expiry of a backoff timer,
    wherein the information on the PS-Poll transmission priorities includes the identifiers of the terminals having the downlink data to receive.

2. The method of claim 1, further comprising transmitting, if the PS-Poll of the second terminal with the priority prior to the priority of the first terminal is not detected during a certain time period, the PS-Poll of the first terminal.

3. The method of claim 1,
    wherein the information on the PS-Poll transmission priorities further includes a partial virtual bitmap field with bits corresponding to the identifiers of the terminals having the downlink data to receive, the bits being set to indicate presence of the downlink data to receive.

4. The method of claim 3, further comprising:
    determining whether to receive the downlink data based on the partial virtual bitmap field; and
    identifying, if the first terminal determines to receive the downlink data, the PS-Poll transmission priorities of the terminals.

5. The method of claim 1, further comprising:
    transmitting, if the PS-Poll transmission priority of the first terminal is a highest priority, the PS-Poll of the first terminal upon expiry of the backoff timer; and
    monitoring the PS-Polls of other terminals among the terminals having the downlink data to receive.

6. The method of claim 1, wherein the arrangement order includes a descending order or an ascending order.

7. A first terminal among terminals for transmitting a power saving poll (PS-Poll) in a wireless communication system, the terminal comprising:
    a transceiver; and
    at least one processor configured to:
        control the transceiver to receive information on PS-Poll transmission priorities of the terminals having downlink data to receive,
        determine the PS-Poll transmission priorities according to an arrangement order of identifiers of the terminals having the downlink data to receive,
        monitor a PS-Poll of at least one of the terminals,
        identify, based on the PS-Poll transmission priorities, whether a PS-Poll transmitted by a second terminal among the terminals with a priority prior to a priority of the first terminal is detected, and
        control the transceiver to transmit, if the PS-Poll of the second terminal with the priority prior to the priority of the first terminal is detected, a PS-Poll of the first terminal after expiry of a backoff timer,
    wherein the information on the PS-Poll transmission priorities includes the identifiers of the terminals having the downlink data to receive.

8. The first terminal of claim 7, wherein the at least one processor is further configured to control the transceiver to transmit, if the PS-Poll of the second terminal with the priority prior to the priority of the first terminal is not detected during a certain time period, the PS-Poll of the first terminal.

9. The first terminal of claim 8, wherein the information on the PS-Poll transmission priorities further includes a partial virtual bitmap field with bits corresponding to the identifiers of the terminals having the downlink data to receive, the bits being set to indicate presence of the downlink data to receive.

10. The first terminal of claim 9, wherein the at least one processor is further configured to:
    determine whether to receive the downlink data based on the partial virtual bitmap field, and
    identify, if the first terminal determines to receive the downlink data, the PS-Poll transmission priorities of the terminals.

11. The first terminal of claim 7, wherein the at least one processor is further configured to:
    control the transceiver to transmit, if the PS-Poll transmission priority of the first terminal is a highest priority, the PS-Poll of the first terminal upon expiry of the backoff timer, and
    monitor the PS-Polls of other terminals among the terminals having the downlink data to receive.

12. The first terminal of claim 7, wherein the arrangement order includes a descending order or an ascending order.

13. At least one non-transitory computer readable storage medium of a terminal for storing a computer program of instructions configured to be readable by at least one processor for instructing the at least one processor to execute a computer process including:
    receiving information on PS-Poll transmission priorities of terminals having downlink data to receive;
    determining the PS-Poll transmission priorities according to an arrangement order of identifiers of the terminals having the downlink data to receive;
    monitoring PS-Polls transmitted by at least one of the terminals having the downlink data to receive;
    identifying, based on the PS-Poll transmission priorities, whether a PS-Poll transmitted by another terminal among the terminals with a priority prior to a priority of the terminal is detected; and transmitting, if the PS-Poll of the other terminal with the priority prior to the priority of the terminal is detected, a PS-Poll of the terminal after expiry of a backoff timer, wherein the information on the PS-Poll transmission priorities includes the identifiers of the terminals having the downlink data to receive.

* * * * *